United States Patent [19]

Ando

[11] 4,280,154
[45] Jul. 21, 1981

[54] SLOT LOADING CASSETTE TAPE MECHANISM

[76] Inventor: Masatoshi Ando, 34-4-701, Denenchofu 2-chome, Ohja-ku, Tokyo, Japan

[21] Appl. No.: 6,255

[22] Filed: Jan. 24, 1979

[30] Foreign Application Priority Data

Jan. 24, 1978 [JP] Japan .................................. 53-6579

[51] Int. Cl.³ .................... G11B 15/28; G11B 5/54; G11B 21/22
[52] U.S. Cl. ............................. 360/96.4; 360/105; 242/200
[58] Field of Search .................. 360/96.4, 105, 96.3; 242/200

[56] References Cited

U.S. PATENT DOCUMENTS

| | | | |
|---|---|---|---|
| 3,719,364 | 3/1973 | Hessland et al. | 360/96.4 |
| 3,810,241 | 5/1974 | Murata | 360/96.4 |
| 4,014,041 | 3/1977 | Cicatelli | 360/96.4 |

Primary Examiner—Robert S. Tupper
Attorney, Agent, or Firm—Cantor and Singer

[57] ABSTRACT

A tape mechanism which, by means of a simple mechanism, enables fast-forwarding or rewinding of the tape from its normal play/record condition, the mechanism consisting of a main chassis to which a sub-chassis is hingedly attached. The sub-chassis has mounted thereon, a capstan, a tape take-up spindle with clutch drive gear, a tape rewind spindle with gear, a rotatably mounted gear plate, an intermediate drive gear engaged with a drive gear both rotatably mounted on this plate. A selector plate, rotatably supported by the chassis which actuates a lever, in turn moves the head plate outwardly from the cassette causing the tape-head and pinch-roller to be disengaged from the tape and capstan and thereby enables the tape to be fast-forwardly wound, or enables the tape to be rewound by means of a connecting bar and connecting rod arranged to move the aforesaid selector plate, to pull and rotate the spring loaded gear plate so that the driven gear and gear driving take-up spindle become disengaged to free the take-up spindle, and engage the intermediate drive gear with the gear of the tape rewind spindle.

6 Claims, 7 Drawing Figures

F I G. 6
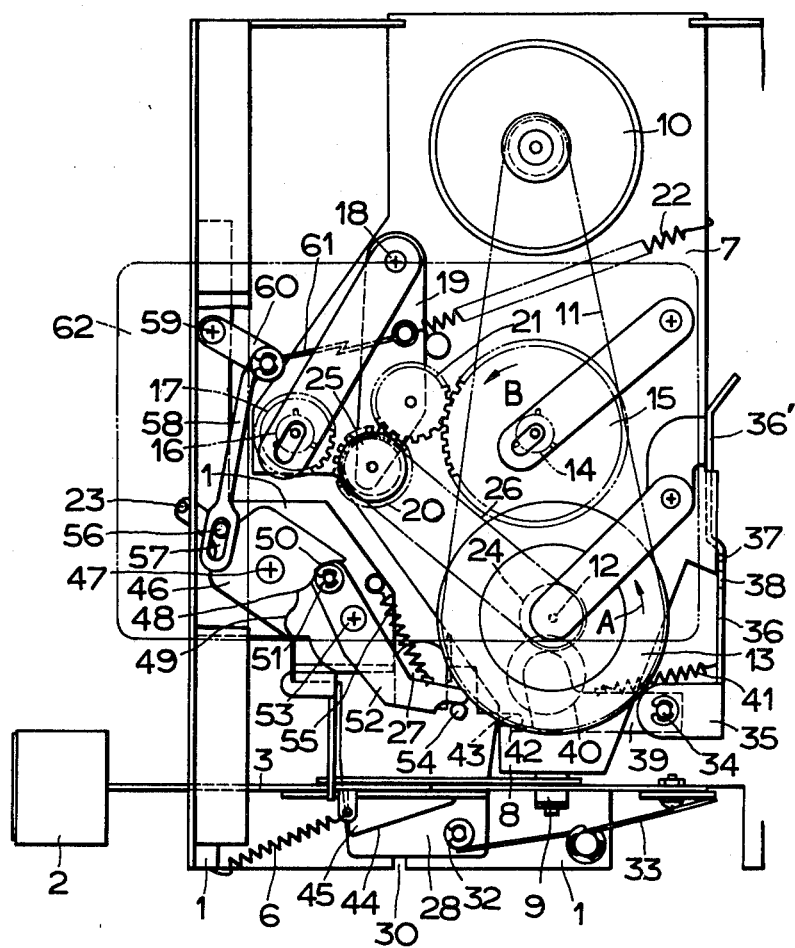

SLOT LOADING CASSETTE TAPE MECHANISM

BACKGROUND OF THE INVENTION

This invention relates to slot loading tape cassette mechanisms.

Heretofore, in easy-to-operate simple slot-loading mechanisms, tape fast-forwarding was provided by pushing a slide-bar slidably attached to the mechanism's cassette eject push-button slide-bar, and no rewind mode was provided.

The invention provides a slot loading cassette tape mechanism comprising a main chassis; a sub-chassis hingedly connected at one end to the main chassis; a tape drive capstan; a first gear arranged to drive a tape take-up spindle; a second gear attached to a tape rewind spindle; a rotatable plate carrying an intermediate drive gear and an intermediate driven gear; a selector mechanism pivotally mounted on the main chassis and arrangeable to retract a tape-head mounted on a head plate which in turn disengages a pinch-roller from the tape and capstan; the arrangement being such that when the tape head is retracted and the pinch-roller is disengaged while the rotatable plate is in a first position in which the intermediate drive gear is engaged with the tape drive capstan and the intermediate driven gear is engaged with said first gear the tape take-up spindle is driven at increased speed to give fast-forward winding of the tape; the selector mechanism also being arrangeable not only to cause retraction of the tape-head and disengagement of the pinch-roller but also to rotate said rotatable plate at the same time into a second position such as to disengage said intermediate driven gear to free the tape take-up spindle and engage said intermediate drive gear with said second gear to rotate the tape rewind spindle and bring about rewinding of the tape.

The invention makes it possible to provide a mechanism in which, when a cassette is loaded and the selector lever is manually shifted to either side of a center position, the tape head and pinch roller become disengaged from the tape and tape drive capstan; at the same time, the intermediate drive gear engaged with the intermediate driven gear is arranged to swing as an assembly, to either engage or disengage the gear wheel arranged to drive the tape take-up spindle shaft or to disengage or engage the gear wheel fixed to the tape rewind spindle shaft; depending on which direction the selector lever is moved from its center position, to either rapidly take-up the tape in the "fast-forward" mode, or rewind the tape in the "rewind" mode of operation.

SUMMARY OF THE INVENTION

This invention greatly enhances the mechanism's record/play function by providing a mode selector switch which enables reliable and simple selection of either the "fast-forward" or the "rewind" mode, from the normal play/record transportation mode.

BRIEF DESCRIPTION OF THE DRAWINGS

By way of example, a specific embodiment of the invention will now be described, with reference to the accompanying drawings, in which:

FIG. 6 is a plan view of the mechanism in the fast-forward mode; and

DETAILED DESCRIPTION OF THE INVENTION

Figure 1:
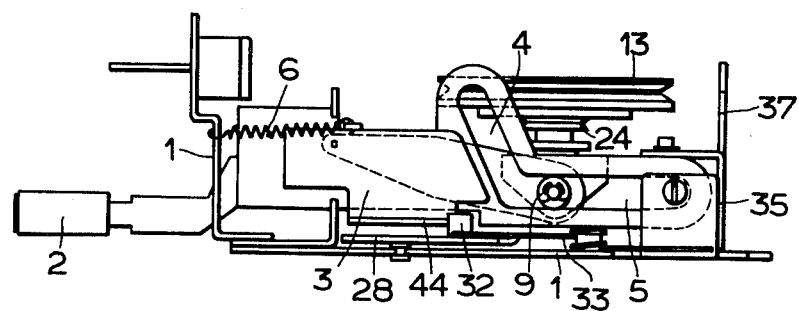
FIG. 1 is a side view of an embodiment of slot loading cassette mechanism according to the invention.
Figure 3:
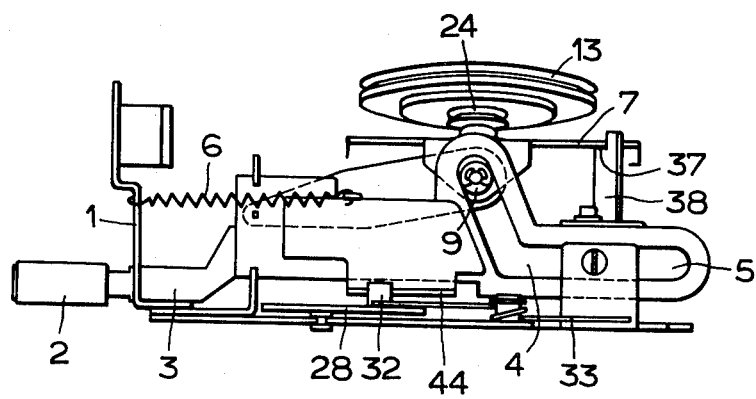
FIG. 3 is a side view with the cassette ejected.

Push button slide-bar (3), with push button (2) at one end has slot (5) with slanting part (4) at its other end, and is slidably mounted on a main chassis in the form of a chassis plate (1) of the device. Coil spring (6) attached at one end to slide bar (3), is attached at the other end to chassis plate (1) to spring load the slide bar (3) to return it to its initial position when released after it is pushed. A sub-chassis in the form of a hinged plate (7), is hinged at one end to chassis plate (1) and has roller (9) rotatably mounted on its free end to engage the afore-described slot (5) of slide-bar (3). Hinged plate (7) has capstan (12) with flywheel pulley (13) driven via motor (10), by rubber belt (11). Tape take-up hub spindle (14) has take-up gear wheel (15) rotatably attached thereon and connected by a friction clutch arrangement. Tape rewind hub spindle (16) has a small gear wheel (17) attached thereon. Gear plate (19) has drive gear (20) engaged to driven gear (21) rotatably mounted thereon, said plate (19) being rotatably mounted at its other end to the hinged plate by stud pin (18). Coil spring (22) pulls gear plate (19) so that gear (21) normally engages gear (15). Selector lever (23) (described in detail later) pulls gear plate (19) to engage intermediate drive gear (20) with rewind gear (17), and to disengage driven gear (21) from take-up gear (15). Tape fast-forward/rewind drive pulley (24) directly under flywheel pulley (13) drives pulley (25) of drive gear (20) by belt (26). Head mounting plate (28), with head (27) mounted thereon, is slidably mounted on chassis (1). Guide stud (29) fixed to head plate (28) engages guide slots (30) and (31) to ensure accurate slide motion and stop position of head plate (28). Stud pin (32) on head plate (28) is spring loaded and pushed by spring (33). Actuating arm (35) with upward protruding part (36) and step (37) on its vertical side (38), is pivotally mounted on main chassis plate (1) by pivot stud (34). Pinch roller arm (39), also pivoted on stud (34), has pinch roller (40) mounted on its free end. Protruding part (36) of actuating arm (35) is bridged with coil spring (41) to spring load pinch roller (40) against capstan (12). Protrusion (42) at end of pinch roller arm (39) engages finger (43) formed on head plate (28). Tension of spring (41) pulls pinch roller arm (39) which in turn pushes head plate (28) towards the tape. Cam plate (45) with inwardly sloping surface (44) engages the aforesaid stud pin (32). Selector plate (46) rotatably mounted on the main chassis by screw (47) has selector lever (23) formed at its protruding end and recessed indents (48), (49), and (50) on its actuating end. A head lifting lever (52) is pivotally mounted on the main chassis (1) by means of screw (53) and follower roller (51) engaging actuating indents of selector plate (46) is rotatably mounted on the end of the head lifting lever (52) which engages stud (54) on head plate (28). Coil spring (55) bridges stud (54) with main chassis (1). Stud (56) fixed to the base of the selector lever part of selector plate (46) engages the slotted end of selector connection bar (58) attached to the free end of arm (60); pivotally mounted on its other end to main chassis (1) by pivot screw (59). The end of arm (60) has a pivot stud, to which the aforesaid connecting bar (58) and connecting rod (61), connected to gear plate (19), is rotatably attached.

Selector plate (46) has a neutral position between the "fast-forward" and "rewind" positions. This position is determined by engagement of roller (51) with the indent (48) in the center of selector plate (46). When in the neutral position, stud pin (56) of selector plate (46) is positioned at the end of slot (57), so that when the selector lever is shifted to the "fast-forward", position, connecting bar (58) remains stationary. Furthermore, in the drawings (36') is the end part of protrusion (36), and (62) in the cassette.

The following describes the ejection and insertion of cassette (62), by reference to FIGS. 1, 2, 3, 4 and 5.

Figure 2:
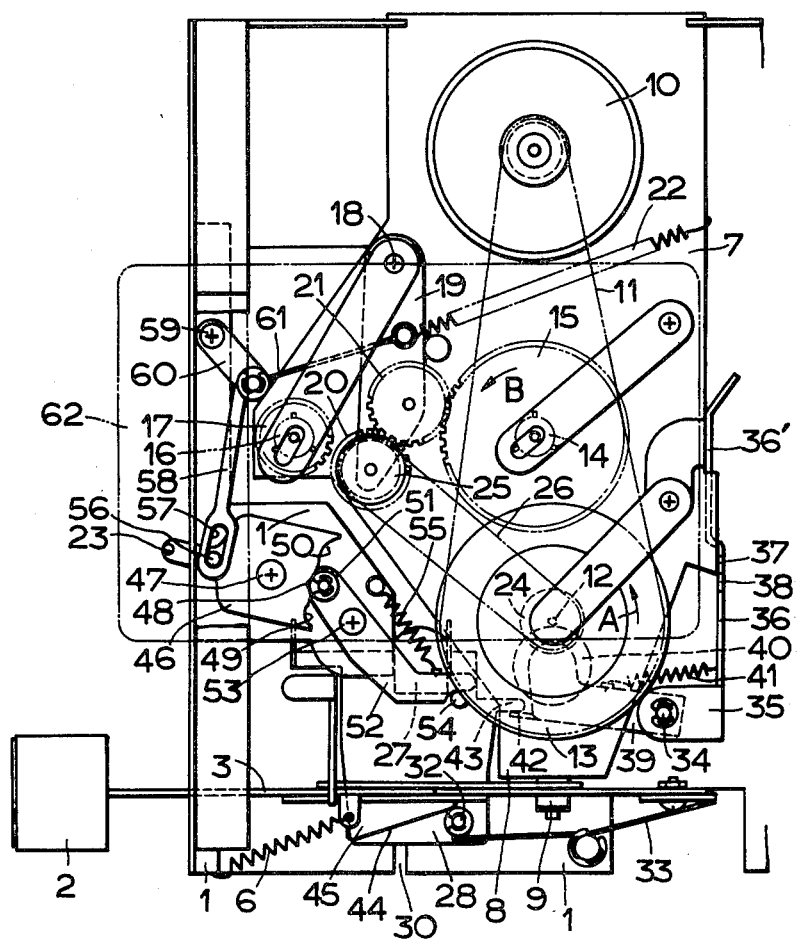
FIG. 2 is a plan view of the mechanism of FIG. 1.
Figure 4:
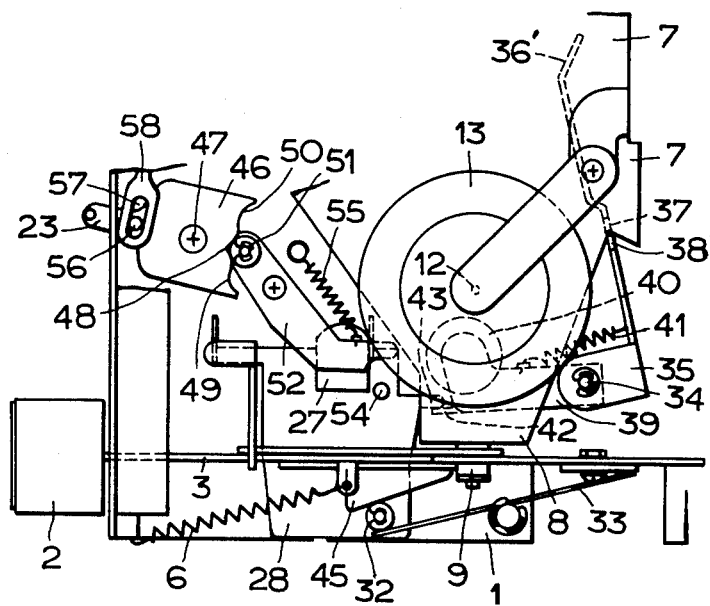
FIG. 4 is a partial plan view with the cassette ejected.
Figure 5:
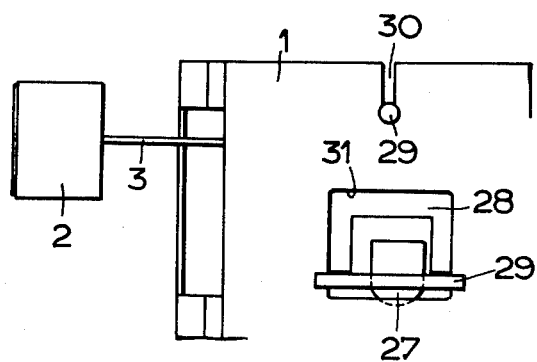
FIG. 5 is a partial bottom view.

As shown in FIGS. 1 and 2, when cassette (62) is loaded, and the mechanism is in the "play/record" mode, or when it has just stopped playing, and push button (2) is pushed against the force of spring (6), slide bar (3) moves forward and roller (9) in slot (5) moves along inclined part (4) of the slot to raise hinged plate (7). Then capstan (12), take-up hub spindle (14), and rewind hub spindle (16), mounted on hinged plate (7) are raised out of their respective openings in cassette (62). Simultaneously, oblique side (44) of cam plate (45) on the lowest part of slide bar (3), engages roller (32) of head plate (26), and pushes the head plate outwardly against the load of spring (33). Head (27) is thereby retracted from the cassette (62) while at the same time arm (39) with protrusion (42) which engages protrusion (43) of head plate (68) is rotated counter-clockwise against the loading of spring (41) so that pinch roller (40) mounted on the end of arm (39) is retracted from cassette (62). Simultaneously, the pull of spring (41) rotates arm (35) so that arm plate (36) of arm lever (38) engages the right-hand edge of hinged plate (7), while tip (36') of arm extension (36) pushes cassette (62) outwards from the mechanism to permit unloading.

When arm plate (36) rotates counter-clockwise, step (37) of arm lever (38) engages the right edge and bottom of hinged plate (7) and locks said plate (7) in its raised position.

With the hinged plate (7) raised in its locked position, the mechanism is prepared for loading the cassette. When cassette (62) is inserted, and its end hits tip (36') of arm plate (36), said arm plate will rotate around pivot (34), and stepped part (37) of lever (38) will disengage the right edge of hinged plate (7) to release support. Pull of spring (6) will cause plate (3) to slide outwardly in the direction of pushbuttom (2). Roller (9) engaged in slot (5) will move along its inclined region to lower hinged plate (7). The tape in the cassette is engaged by capstan (12) and pinch roller (40), and tape take up spindle (14) and tape rewind spindle (16) is inserted into the cassette (12), and tape head (27) is moved into the cassette to engage the tape. In this condition the mechanism is prepared to play or record from or on the tape.

This invention is concerned with the mechanism for fast-forwarding the tape which is described hereunder.

When cassette tape (62) is inserted and the mechanism is placed in the record/play condition, rotation of motor (10) will drive pulley (13) through belt (11), and capstan (12) will rotate with flywheel pulley (24) in the direction shown by arrow A. Belt (26), drives pulley (25) of intermediate drive gear (20) to drive idler gear (21). Idler gear (21) in conjunction with take-up clutch gear (15) rotates tape take-up spindle (14) in the direction shown by arrow B for normal take-up of the tape.

When tape-wind selector lever (23) is depressed to the extreme left (facing mechanism) as shown in FIG. 6 selector plate (46) rotates with pivot screw (47) as its axis in a clockwise direction, roller (51) at the end of head lifting lever (52) becomes engaged in depression (50) of the selector plate (46). When roller (51) engages depression (50), head lifting lever (52) rotates in a clockwise direction with screw (53) as its pivot, head plate (28) engaging end of lever (52), pushes stud (54) fixed to head plate (28) to push the plate outwards and retract tape head (27); fixed to the head plate (28), from the tape's surface. Outward movement of the head plate causes protrusion (43) to push protrusion (42) of the pinch roller arm to rotate roller arm (39) in a counter-clockwise direction against pull of spring (41), and thereby lift pinch roller (40) from the tape to disengage the tape from the capstan (12). Retraction of the tape head (27) from the tape, and disengagement of pinch-roller (40) from the capstan (12) frees the tape to allow take-up spindle (14) to wind the tape at full speed (i.e. without slippage of its clutch). When selector lever (23) is shifted to its mid-position by rotating selector plate (46) in a counter-clockwise direction around pivot screw (47) so that roller (50) engages the center indent (48), head lifting lever (52) is returned to its normal position and head (27) will also be returned to engage the tape. Also pinch roller (40) will be returned to engage the capstan (12) and the tape there-between, to drive the tape at normal speed to enable the record/play function to take place. At this time, stud (56) of selector plate (46) moves within the elongated slot (57) of connecting rod (58) so that the rod remains at a standstill.

Figure 7:
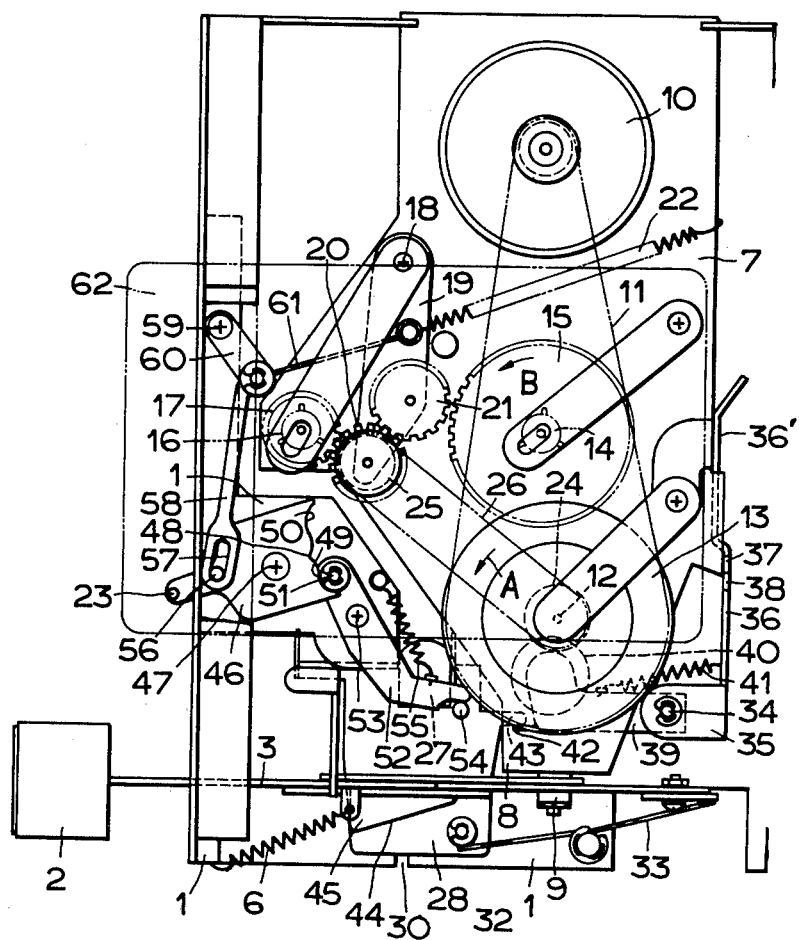
FIG. 7 is a plan view of the mechanism in the rewind mode.

Furthermore, this invention relates to the rewind function of this mechanism which is described in the following. When selector lever (23) is moved to the right as shown in FIG. 7, selector plate (46) will rotate around pivot screw (47) in a counter-clockwise direction, and roller (51) of head lifting lever (52) will engage the lowermost indent (49) of the selector plate (46). When roller (51) is thus engaged, lever (52) will rotate clock-wise so that its other end will push stud (54) of the head plate (28) to lift tape head (27) from the tape surface. Movement of head plate (28) will cause pinch roller arm (39) to rotate in a counter-clockwise direction against the pull of spring (41), to disengage pinch roller (40) from capstan (12). At the same time, stud (56) at the selector lever end of the selector plate, engaged at the bottom of elongated slot (57) of connecting bar (58) will now pull connecting bar (58) which in turn pulls lever arm (60) and connecting rod (61) connecting said arm (60) with gear actuating plate (19), which rotatably mounts intermediate drive gear (20) and driven gear (21) at its swiveling end and is pivotally mounted to the chassis at its other end, thus when the gear plate (19) is pulled, it rotates clockwise to disengage gear (21) from tape take-up gear (15); to free take-up reel spindle, and engage gear (20) with gear (17) of the tape rewind spindle (16). The above, retraction of the tape head from the tape, disengagement of the pinch-roller from the capstan, freeing tape take-up spindle from take-up drive, and the connecting of the drive system to the rewind spindle (16), enables the mechanism to rewind the tape.

Returning the tape wind selector lever to center or neutral position, causes selector plate (46) to rotate clockwise and roller (51) of tape head lifter arm (52) to engage center detent (48) of the selector plate. The other end of lifter arm (52) causes the head plate (28) and tape head (27) to move inwardly to engage the tape as before, this movement causes release of the pinch roller arm so that pinch roller is pulled against the capstan by the pull of spring (41).

Return of selector lever (23) also causes stud (56) of the lever to release connecting bar (58) which is pulled by spring (22) to return arm (60), connecting rod (61), and gear actuating plate (19) to its normal position. With return of gear actuating plate (16), intermediate driven gear (21) engages take-up spindle clutch gear (15) and intermediate drive gear (20) is disengaged from tape-rewind spindle gear (17) to free tape-rewind spindle (16). In this manner normal record-play status of the mechanism is restored.

The invention is not restricted to the details of the foregoing embodiment.

What is claimed is:

1. A slot loading cassette tape mechanism comprising: a main chassis; a sub-chassis hingedly connected at one end to the main chassis and carrying a flywheel pulley with a tape drive capstan thereon, a tape take-up spindle, and a tape rewind spindle; a first gear means for driving said tape take-up spindle; a second gear attached to said tape rewind spindle; a rotatable plate carrying an intermediate drive gear and an intermediate driven gear mounted on said sub-chassis; said intermediate driven gear being normally engaged with said first gear means and said intermediate drive gear being driven by said flywheel pulley through an intermediate drive pulley attached to said flywheel pulley and an intermediate driven pulley attached to said intermediate drive gear; a head plate mounted on the main chassis; a tape head mounted on the head plate; a pinch roller mounted on said main chassis and adapted to bear against said capstan; selector means pivotally mounted on the main chassis to pivot to a first position causing said tape-head mounted on said head plate to retract, retraction of said head plate causing disengagement of said pinch roller from the tape and capstan, thereby causing driving of said tape take-up spindle at increased speed to give fast-forward winding of the tape; the selector means being pivotable to a second position causing retraction of the tape head, disengagement of the pinch roller, and rotating said rotatable plate at the same time into a second position wherein said intermediate driven gear is disengaged from said first gear means to free the tape take-up spindle and wherein said intermediate drive gear is engaged with said second gear to rotate the tape rewind spindle and bring about rewinding of the tape; said sub-chassis being raised and said head and pinch roller being retracted from the cassette for loading and unloading.

2. A slot loading cassette tape mechanism as claimed in claim 1, in which the tape drive capstan, the first gear and tape take-up spindle, the second gear and tape rewind spindle, and the rotatably mounted plate are all mounted on the sub-chassis.

3. A slot loading cassette tape mechanism as claimed in claim 1 or claim 2, in which the first gear drives the tape take-up spindle via a clutch.

4. A slot loading cassette tape mechanism as claimed in claim 1 or 2, in which the selector means comprises a selector plate which controls the tape head and pinch-roller via a lever.

5. A slot loading cassette tape mechanism as claimed in claim 4, in which the selector plate is connected to the rotatable plate via a connecting rod.

6. A slot loading cassette tape mechanism as claimed in claim 5 in which the connecting rod operates via a pin and slot connection, the selector plate being movable between: a central position in which the pin lies at one end of the slot, the rotatable plate is in the first position, and the tape head and pinch-roller are engaged, so that normal recording and play can take place; a fast-forward position to one side of the central position, in which the pin lies at the other end of the slot, the rotatable plate is therefore still in the first position, the tape head is retracted and the pinch-roller is disengaged; and a rewind position to the other side of the central position, in which engagement of the pin with the one end of the slot causes movement of the rotatable plate into the second position, the tape head is retracted and the pinch-roller is disengaged.

* * * * *